G. D. MILES.
HARROWS.
No. 194,834. Patented Sept. 4, 1877.
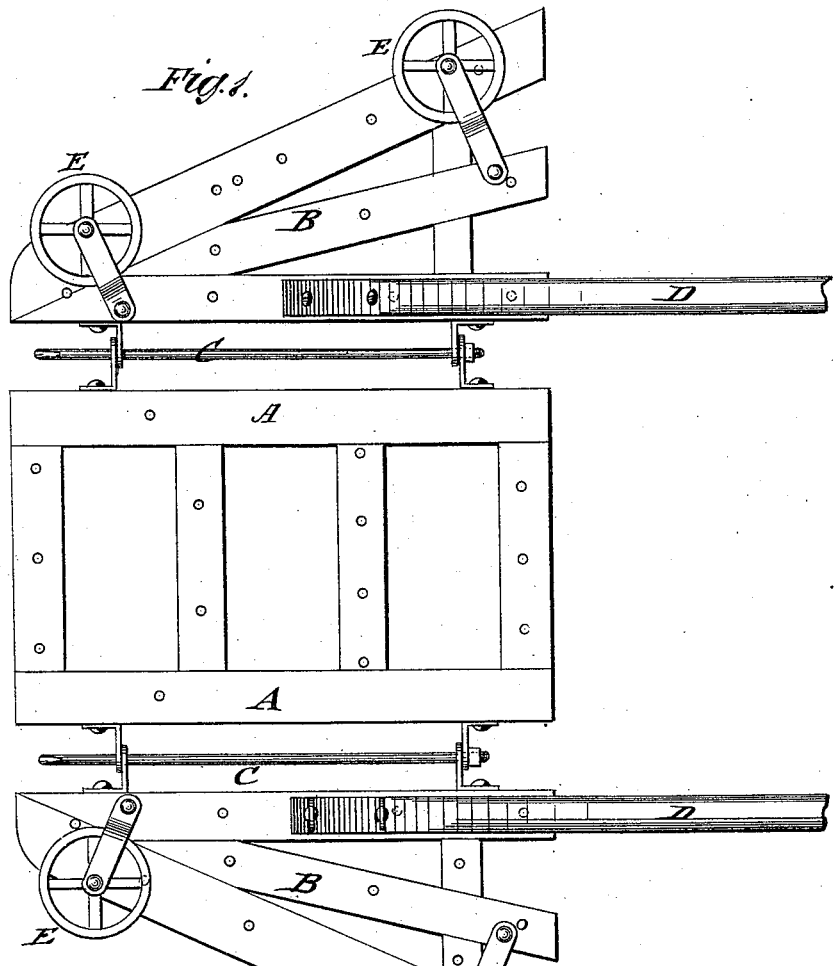
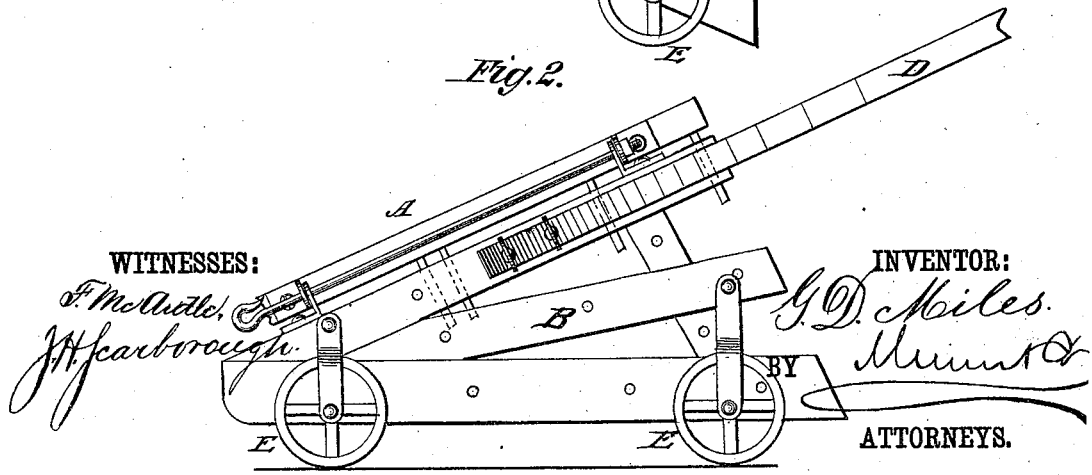
WITNESSES:
INVENTOR:
G. D. Miles
BY
ATTORNEYS.

UNITED STATES PATENT OFFICE.

GEORGE D. MILES, OF CAIRO, PENNSYLVANIA.

IMPROVEMENT IN HARROWS.

Specification forming part of Letters Patent No. 194,834, dated September 4, 1877; application filed June 25, 1877.

*To all whom it may concern:*

Be it known that I, GEORGE D. MILES, of Cairo, county of Union and State of Pennsylvania, have invented a new and Improved Harrow; of which the following is a specification:

In the accompanying drawing, Figure 1 represents a top view of my improved harrow, and Fig. 2 a side view of the same folded up for being transported.

Similar letters of reference indicate corresponding parts.

The invention will first be described in connection with the drawing, and then pointed out in the claim.

In the drawing, A represents the middle oblong section, and B B the triangular wings or side sections of my improved harrow. The sections are provided with a sufficient number of harrow-teeth in the customary manner, and hinged, by side brackets or staples, to coupling-rods C, so that the side sections may be readily turned and folded on the middle section. The coupling-rods C are secured at the rear ends by nuts to the brackets, and bent into hook shape at the front ends for hitching on the team. By removing the nuts the coupling-rods may be detached and the central section be used either with one side section, or the side sections may be coupled together or used singly as a cultivator, as required. The handles D are attached by strong screw-bolts to the side sections in such a manner as to be detached for being both placed on one side section, when the same is used as a cultivator.

The handles D serve to raise the side sections in passing a stump, rock, or other obstruction, which is a great advantage in harrowing new ground or an orchard, while the coupled side sections without the middle section may be readily used for harrowing corn.

The side sections or wings B may also be provided with wheels E turning on center-pins attached by straps, the front wheel being preferably made in the nature of casters, so as to turn below the wings and admit the easy transportation of the harrow to and from the field. The middle section is first lifted up and the wings drawn by slight side draft under it, to be conveyed as sled or vehicle, as the case may be. The wings are, in the latter case, connected by a chain or other locking mechanism, so as to be at right angles to the raised middle section. The harrow is in this manner adapted in superior manner for the purposes of the farmer, as it may be more conveniently handled and applied for different work.

Having thus described my invention, I claim as new and desire to secure by Letters Patent—

The combination, with the body A, of side-pivoted wings B B and shafts D D, the outer bars of wings being provided with wheels E, and the inner bars being rigidly attached to shafts, as shown and described, for the purpose specified.

GEORGE DAVIS MILES.

Witnesses:
E. S. GUDYKUNST,
M. H. GUDYKUNST.